ns Patent [19]

United States Patent [19]
Irvin et al.

[11] 4,298,976
[45] Nov. 3, 1981

[54] MICROPHONOGRAPH RECORD

[76] Inventors: Ronald D. Irvin, 135 Belwood Gateway, Los Gatos, Calif. 95030; Steven R. Runyan, 4265 Ruthelma St., Palo Alto, Calif. 94307; Hugh P. Sherlock, 1275 Dana Ave., Palo Alto, Calif. 94301

[21] Appl. No.: 764,004

[22] Filed: Jan. 31, 1977

Related U.S. Application Data

[63] Continuation of Ser. No. 532,329, Dec. 13, 1974, abandoned.

[51] Int. Cl.³ .............................................. G11B 3/68
[52] U.S. Cl. ................................................. 369/282
[58] Field of Search ........................ 274/9 C, 42, 41; 35/8 A, 35 E; 360/135, 133, 101; 369/282

[56] References Cited
U.S. PATENT DOCUMENTS

| | | | |
|---|---|---|---|
| 1,150,020 | 8/1915 | Ehlinger | 274/42 R |
| 1,417,339 | 5/1922 | Lenton | 274/41 R |
| 2,486,661 | 11/1949 | Leitner | 274/9 C |
| 3,633,924 | 1/1972 | Cowell et al. | 274/9 C |
| 3,702,032 | 11/1972 | Doring | 274/9 C |
| 3,883,146 | 5/1975 | Johnson et al. | 274/9 C |

*Primary Examiner*—John W. Shepherd
*Attorney, Agent, or Firm*—Lewis Anten

[57] ABSTRACT

Microphonograph record which is to remain stationary while information is being reproduced therefrom formed from a sheet of material and having generally V-shaped locating means formed in the sheet of material which is accessible from one side of the sheet of material. The V-shaped locating means lies in a plane generally parallel to the plane of the sheet of material. The sheet of material is provided with first and second surfaces and has information carried by the sheet of material on at least one surface thereof and arranged in a generally concentric circular pattern. The circular pattern has at its center a point which lies in close proximity to the apex of the V-shaped locating means.

3 Claims, 4 Drawing Figures

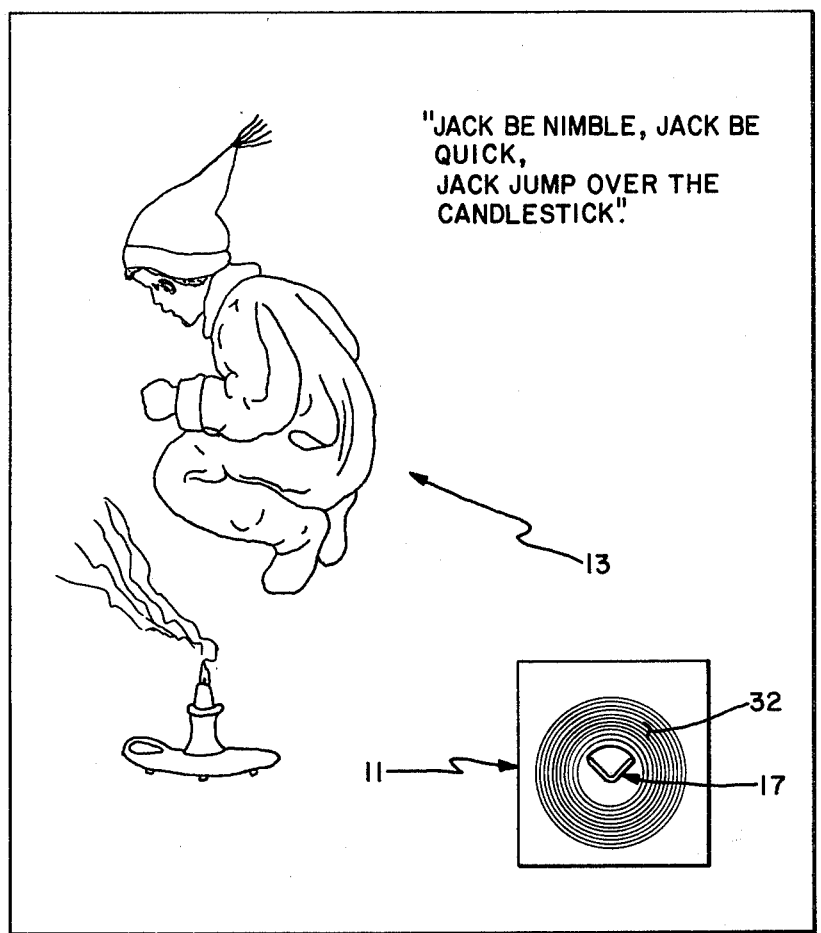
FIG.—1
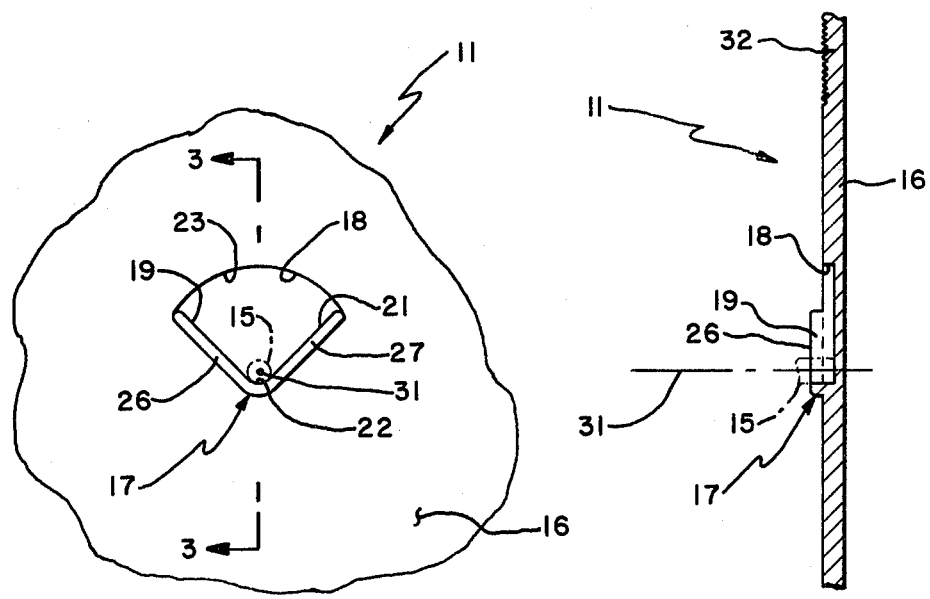
FIG.—2 FIG.—3

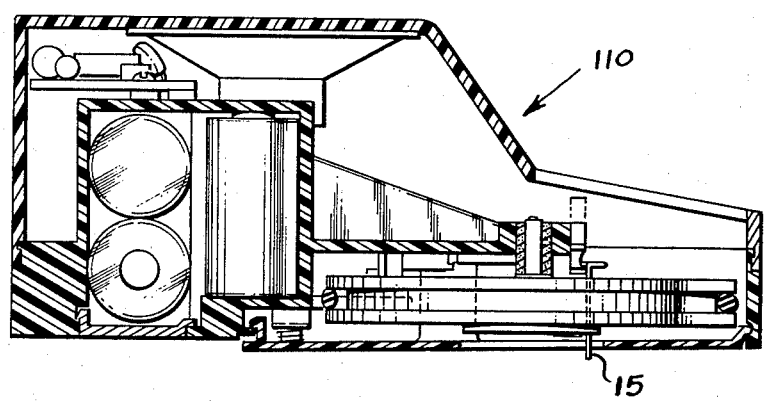

MICROPHONOGRAPH RECORD

This is a continuation of application Ser. No. 532,329, filed Dec. 13, 1974 now abandoned.

BACKGROUND OF THE INVENTION

Microphonograph records have heretofore been provided and have been mounted in a fixed or stationary position on sheets carrying other information related to the information carried by the microphonograph record. In obtaining the information carried by the microphonograph record, it is very important that the microphonograph which is utilized for obtaining the information be properly positioned with respect to the record. In other words, it must be accurately centered on the record to prevent changes in pitch of the recorded sound as the phonograph needle travels around the record in the grooves in the record. Changes in pitch in sound will occur if the microphonograph is not accurately centered with respect to the microphonograph record. Heretofore, it has been the practice to locate the means for centering the microphonograph with respect to the microphonograph record on the sheet which carries the microphonograph. This is disadvantageous because this requires precise positioning of the microphonograph locating means with respect to the microphonograph record carried by the sheet. There is, therefore, a need for a new and improved microphonograph record.

SUMMARY OF THE INVENTION AND OBJECTS

The microphonograph record is of a type which is to remain stationary while the information is being reproduced therefrom. It consists of a sheet of material having generally V-shaped locating means formed in said sheet of material on one side thereof so that the locating means is accessible from said one side. The information is carried by the sheet of material on one side and is arranged in a generally concentric circular pattern. The circular pattern has at its center a point which lies in close proximity to the apex of the V-shaped locating means.

In general, it is an object of the present invention to provide a microphonograph record which has microphonograph positioning or locating means carried by the same.

Another object of the invention is to provide a record of the above character in which the microphonograph locating means is of a type which can be formed at the same time that the information is formed on the record.

Another object of the invention is to provide a record of the above character in which the locating means is of the type which can be readily used to obtain the desired registration between the record and the microphonograph.

Another object of the invention is to provide a record of the above character in which the locating means is of the type which can be readily used by children in locating or positioning the microphonograph.

Another object of the invention is to provide a record of the above character in which the locating means is formed in the record by providing a recess in the record.

Another object of the invention is to provide a record of the above character in which the locating means is formed in the record by placing a protrusion in the record.

Another object of the invention is to provide a record of the above character in which the protrusion is such as to minimize the overall thickness of the record.

Another object of the invention is to provide a record of the above character in which a single V-shaped locating means is provided for at least one side of the record.

Another object of the invention is to provide a record of the above character in which the apex of the V-shaped locating means is at the center for recording information on the record.

Additional objects and features of the invention will appear from the following description in which the preferred embodiment is set forth in detail in conjunction with the accompanying drawing.

BRIEF DESCRIPTION OF THE DRAWINGS

FIG. 1 is a plan view of the sheet having mounted thereon a microphonograph record incorporating the present invention.

FIG. 2 is an enlarged detail view of a portion of the microphonograph record shown in FIG. 1.

FIG. 3 is a cross-sectional view taken along the line 3—3 of FIG. 2.

FIG. 4 is a side sectional view of a hand held microphonograph unit used in association with the phonograph records of FIGS. 1-3.

DESCRIPTION OF THE PREFERRED EMBODIMENT

The microphonograph record incorporating the present invention is mounted upon a sheet 12 of a suitable material such as paper. The sheet 12, by way of example, could be one page of a children's book carrying a scene 13 about which there is recorded information on the microphonograph record 11 immediately below the scene. The microphonograph record 11 is secured to the sheet 12 by suitable means such as an adhesive so that it remains in a fixed or stationary position with respect to the sheet 12.

The microphonograph record is also formed from a sheet 16 of a suitable material such as a plastic. One plastic which is particularly suitable for making a microphonograph record is polyvinyl chloride. The sheet has a typical thickness ranging from 0.006 to 0.015 of an inch. Typically, it is essentially transparent. However, if desired, it can be of any desired color. The plastic from which the sheet 16 is formed is generally relatively flexible so that it will bend and flex with the page 12 upon which it is mounted.

In the formation of the microphonograph record 11 hereinafter described, a plurality of the records are formed from a large sheet of material and thereafter individual records 11 are formed from the sheet material. Each of the microphonograph records as shown in FIGS. 1, 2 and 3 carries locating means 17 on at least one side thereof. The locating means 17 is to be used cooperatively with a registration pin 15 shown in broken lines which is carried by a microphonograph so as to precisely position the microphonograph with respect to the microphonograph record. Microphonographs of this general type are disclosed in copending application Ser. No. 347,841, filed Apr. 4, 1973. Although there is disclosed in that patent application two registration pins for a microphonograph, it is envisioned with the microphonograph record that the microphonograph would have a single centered registration pin which would be used for precisely positioning the microphonograph with respect to the microphonograph record so that the information carried by the microphonograph record could be audibly reproduced by the microphonograph from the record.

As can be seen particularly in FIGS. 1, 2 and 3, the locating means 17 is generally V-shaped. It is formed in at least one of the two opposite sides or surfaces of the sheet 16 and lies in a plane which is generally parallel to the plane of the sheet. The V-shaped locating means is accessible to the registration pin of the microphonograph on the same side or surface on which it is located. The V-shaped locating means 17 is preferably formed in the record itself from the material of the record. However, it should be appreciated that the V-shaped locating means 17 can be formed as a separate part and secured to the record or sheet by suitable means such as an adhesive.

In order to obtain locating means which has a sufficient depth so that it can be readily located via the registration pin of the microphonograph without greatly increasing the thickness of the sheet, it is desirable to form the locating means so that portions of the same are formed below the surface of the record to form a recess and so that portions extend above the record to increase the depth of the process. Thus, as shown in FIGS. 2 and 3 at the time that the record is formed, a V-shaped recess 18 is formed in the record to a suitable depth such as 0.005 of an inch below the original surface of the sheet or record. The V-shaped recess is defined by two true planar vertically extending side walls 19 and 21 which extend at an angle to each other of approximately 90° and are jointed at the apex by an arcuate surface 22 having a diameter of approximately 0.048 inch. The walls 19, 21 have a suitable length as, for example, 0.140 inch. The recess 18 is also defined by an arcuate side wall 23 joining the side walls 19 and 21 on a radius of approximately 0.140 inch.

The V-shaped locating means 17 also includes a pair of raised ribs 26 and 27 of suitable width as, for example, 0.031 inch, which also extend at the same angle as the side walls 19 and 21 as, for example, 90° in which the side walls 19 and 21 form the inner walls of the ribs 26 and 27 and are jointed at an apex also defined by the arcuate side wall 22. The ribs can have any suitable width as, for example, 0.031 of an inch and have a suitable height as, for example, 0.005 of an inch so that the overall depth of the V-shaped locating means is approximately 0.010 with 0.005 being provided by the recess and 0.005 being provided by the raised ribs 26 and 27. As can be seen from FIG. 1, the V-shaped locating means 17 is positioned in such a manner so that it faces upwardly with respect to the plane of the sheet 12. However, it should be appreciated that, if desired, the V-shaped locating means can have any other desired orientation as, for example, it can open towards the bottom or to either of the two sides of the sheet. The apex of the V-shaped locating means 17 is formed in such a manner that the centerline of the registration pin of the microphonograph seats in close proximity to the apex of the recess and so that the centerline of the microphonograph registration pin is centered at the point 31 disposed within the locating means 17.

Information is carried by the microphonograph record on the same side on which the V-shaped locating means is located and generally it takes the form of a plurality of grooves 32 which are formed in the conventional manner to record sound information therein. The grooves 32 are arranged in a generally concentric pattern with the beginning of the information commencing from the inside of the circular pattern and the end of the information terminating at the outside of the circular pattern. However, alternatively, the beginning of the information can commence from the outside of the pattern and the end of the information can terminate at the inside of the pattern. The circular pattern has at its center the center point 31 which lies in close proximity to the apex of the V-shaped locating means 17. It should be appreciated that, if desired, the information can be recorded in other ways on the record as, for example, by the use of magnetic recording tehcniques.

In order to ensure the greatest precision in the microphonograph records, it is desirable, although not absolutely necessary, that the information to be carried by the record be impressed into the record at the same time that the V-shaped locating means is impressed into the record. This ensures greater precision in the registration between the V-shaped locating means 17 and the information carried by the record. Since the record can be manufactured in a single operation, a considerable cost saving over two separate operations is achieved.

In utilization of the microphonograph record, the microphonograph is positioned over the record and the registration pin carried by the microphonograph is brought downwardly into the open end of the V-shaped locating means until it is positioned in close proximity to the apex. At the time, the phonograph needle or the information translating means carried by the microphonograph can be placed in operation to cause it to translate information carried by the record. In the event the information is carried in grooves, a needle will follow the grooves from the inside out, or from the outside in depending on the design of the microphonograph record and will continue its travel until the desired information has been obtained from the record. Since the microphonograph has been accurately centered with respect to the record, this will prevent changes in pitch of the recorded sound as the phonograph needle travels on the record. If the microphonograph was not properly centered with respect to the record, changes in pitch would occur.

Even though relatively thin microphonograph records have been utilized, it has been possible to provide locating means in the record which can be readily observed and used to guide the microphonograph into the proper position to play the record. This locating means has been obtained without greatly increasing the thickness of the record which is desirable in the event that the records are placed on pages of a book so that the thickness of the book will not be unduly increased by the records. It is for this reason that a portion of the locating means has been recessed in the record by providing the V-shaped recess 18 and a portion of the locating means has been positioned above the record in the form of the ribs 26 and 27 which extend the height of the V-shaped recess. Thus, by way of example with a record having a thickness of 0.006 to 0.015 of an inch, it is possible to obtain V-shaped locating means having a depth of approximately 0.010 of an inch by providing a recess having a depth of 0.005 and having ribs with a height of 0.005 of an inch.

The distance of the center of the record to the apex of the "V" is determined by the diameter of the registration pin 15 of the microphonograph. For example, if the diameter of the microphonograph registration pin is 0.045 of an inch, the distance from the center point 31 to the arcuate surface 22 of the "V" would be 0.0225 of an inch.

It has been found that the V-shaped locating means is of a type which is sufficient in and of itself to provide visual means for locating the microphonograph as well as physically locating the microphonograph on the record so that the information carried by the record can be reproduced therefrom. The V-shaped configuration of the locating means makes it possible for the user to push or pull the microphonograph in one direction or the other depending upon the orientation of the V-shaped locating means to bring the registration pin of the microphonograph into the center to obtain precise registration for the microphonograph with respect to the microphonograph record.

By utilization of locating means of this type, it is possible to provide records which have recorded messages of different lengths since the message or information is obtained by playing or reproducing the information from the inside to the outside. As pointed out previously, records upon which the information starts on the outside can also use locating means of the same type. The translating means as, for example, a needle carried by the microphonograph always would be dropped into the same position on the record i.e. the inside or the outside of the length of the recorded message carried by the record.

It is apparent from the foregoing that there has been provided a new and improved microphonograph record which has locating means for the microphonograph which is centrally positioned within the record and which serves as a visual means for locating the microphonograph as well as for physically positioning the microphonograph. It is of a type which can be formed at the same time that the record is formed to obtain precise registration of the same.

We claim:

1. A stationary record having sound grooves on a sheet of plastic material, said record having a generally V-shaped locating means formed on one surface of said sheet of material and being accessible to a registration pin from the same side, said V-shaped locating means comprising a recess lying in a plane generally parallel to the plane of the sheet of material, said V-shaped locating means further comprising ribs extending above said sound grooves carried by the sheet of material being located on the same surface as the V-shaped locating means, said sound grooves being arranged in a generally spiral pattern, the pattern of said sound grooves having proximate their center a point which lies in close proximity to the apex of the V-shaped locating means.

2. In the combination of a microphonograph record comprising a plastic sheet of material having sound information means thereon and of a microphonograph of the type having a single registration pin, said record remaining stationary during operation, a generally V-shaped locating means carried by the sheet of material comprising a recess and being disposed on one side of the sheet of material and being accessible to the registration pin from said one side of the sheet of material, the V-shaped locating means lying in a plane generally parallel to the plane of the sheet of material, said V-shaped locating means including ribs extending above the surface of said material, and sound information carrier means being arranged in a generally concentric spiral pattern, the spiral pattern having at its center a point which lies in close proximity to the apex of the V-shaped locating means.

3. The combination of claim 2 in which said locating means is formed as an integral part of the sheet of material.

* * * * *